(12) United States Patent
Umemoto et al.

(10) Patent No.: US 10,184,379 B2
(45) Date of Patent: Jan. 22, 2019

(54) EXHAUST PURIFICATION SYSTEM FOR INTERNAL COMBUSTION ENGINE

(71) Applicant: TOYOTA JIDOSHA KABUSHIKI KAISHA, Toyota-shi, Aichi (JP)

(72) Inventors: Kazuhiro Umemoto, Ebina (JP); Kohei Yoshida, Gotenba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 5 days.

(21) Appl. No.: 15/505,973

(22) PCT Filed: Jul. 2, 2015

(86) PCT No.: PCT/JP2015/003346
§ 371 (c)(1),
(2) Date: Feb. 23, 2017

(87) PCT Pub. No.: WO2016/031114
PCT Pub. Date: Mar. 3, 2016

(65) Prior Publication Data
US 2017/0248060 A1    Aug. 31, 2017

(30) Foreign Application Priority Data
Aug. 27, 2014  (JP) .................................. 2014-172923

(51) Int. Cl.
*F01N 3/021* (2006.01)
*F01N 3/022* (2006.01)
(Continued)

(52) U.S. Cl.
CPC ............. *F01N 9/002* (2013.01); *F01N 3/021* (2013.01); *F01N 3/022* (2013.01); *F01N 3/023* (2013.01);
(Continued)

(58) Field of Classification Search
CPC ........ F01N 3/022; F01N 3/023; F01N 3/0232; F01N 3/0253; F01N 9/002; F01N 2430/085; F01N 2610/03; F01N 2900/1606
See application file for complete search history.

(56) References Cited

U.S. PATENT DOCUMENTS

2004/0139738 A1    7/2004   Kuboshima et al.
2007/0012034 A1    1/2007   Yahata et al.
(Continued)

FOREIGN PATENT DOCUMENTS

EP    1 553 269 A1    7/2005
EP    1 630 368 A1    3/2006
(Continued)

*Primary Examiner* — Audrey K Bradley
(74) *Attorney, Agent, or Firm* — Finnegan, Henderson, Farabow, Garrett & Dunner, LLP (57) ABSTRACT

A particulate filter for trapping the particulate matter which is contained in the exhaust gas is provided inside an engine exhaust passage. Additional fuel is secondarily injected from a fuel injector in an engine expansion stroke or exhaust stroke or hydrocarbons are secondarily added from an addition valve which is provided upstream of the particulate filter in the exhaust pipe. An amount of hydrocarbons which come from the fuel injector or addition valve and then adhere in the form of a liquid to the inflow end of the particulate filter, and an amount of particulate matter which reaches the inflow end of the particulate filter are respectively estimated. A degree of clogging at the inflow end of the particulate filter is estimated based on the amount of hydrocarbons and the amount of particulate matter.

6 Claims, 9 Drawing Sheets

(51) Int. Cl.
*F01N 3/023* (2006.01)
*F01N 3/025* (2006.01)
*F01N 9/00* (2006.01)
*F01N 3/035* (2006.01)

(52) U.S. Cl.
CPC ........... *F01N 3/025* (2013.01); *F01N 3/0232* (2013.01); *F01N 3/0253* (2013.01); *F01N 3/035* (2013.01); *F01N 2430/06* (2013.01); *F01N 2430/085* (2013.01); *F01N 2610/03* (2013.01); *F01N 2900/0406* (2013.01); *F01N 2900/1606* (2013.01); *Y02T 10/47* (2013.01)

(56) References Cited

U.S. PATENT DOCUMENTS

| | | | |
|---|---|---|---|
| 2007/0220866 A1* | 9/2007 | Nishiumi | F01N 3/023 60/286 |
| 2008/0184698 A1* | 8/2008 | Igarashi | B01D 46/0063 60/287 |
| 2009/0145115 A1 | 6/2009 | Torisaka | |

FOREIGN PATENT DOCUMENTS

| | | |
|---|---|---|
| JP | 2005-188396 A | 7/2005 |
| JP | 2006-152870 | 6/2006 |
| JP | 2007-023791 A | 2/2007 |
| JP | 2007-32533 | 2/2007 |
| JP | 4178960 | 11/2008 |
| JP | 2010-101205 | 5/2010 |
| WO | WO2007/026809 A1 | 3/2007 |

* cited by examiner

EXHAUST PURIFICATION SYSTEM FOR INTERNAL COMBUSTION ENGINE

CROSS-REFERENCE TO RELATED APPLICATIONS

This application is a national phase application of International Application No. PCT/JP2015/003346, filed Jul. 2, 2015, and claims the priority of Japanese Application No. 2014-172923, filed Aug. 27, 2014, the content of both of which in incorporated herein by reference.

TECHNICAL FIELD

The present invention relates to an exhaust purification system for an internal combustion engine.

BACKGROUND ART

An exhaust purification system for an internal combustion engine is known in the art, in which a catalyst which forms a honeycomb structure is arranged in an engine exhaust passage, a fuel addition nozzle which secondarily feeds fuel or hydrocarbons is arranged in the exhaust passage upstream of the catalyst, and estimates a degree of clogging at an inflow end of the catalyst based on an amount of particulate matter which flows into the catalyst, an amount of fuel from the fuel addition nozzle, and a temperature of exhaust gas which flows into the catalyst (for example, see PTL 1). In PTL 1, when the degree of clogging reaches a predetermined upper limit degree, clogging removal processing is performed to remove the clogging at the inflow end of the catalyst.

CITATION LIST

Patent Literature

PTL 1: Japanese Patent Publication No. 2007-032533A

SUMMARY OF INVENTION

Technical Problem

In this regard, the fuel which is added from the fuel addition nozzle proceeds through the inside of the exhaust passage, and then reaches the catalyst. In this case, there is part of the fuel which reaches the catalyst in the form of a liquid, while there is part of the fuel which reaches the catalyst in the form of a gas. As mentioned above, in PTL 1, the amount of addition of fuel from the fuel addition nozzle is used as the basis to estimate the degree of clogging. Therefore, in PTL 1, both the amount of the part of the fuel which reaches the catalyst in the form of a liquid and the amount of the part of the fuel which reaches the catalyst in the form of a gas are used as the basis to estimate the degree of clogging.

However, as explained in detail later, according to the present inventors, it was discovered that the clogging at the inflow end of the catalyst is caused by the hydrocarbons which adhere to the inflow end of the catalyst in the form of a liquid. Therefore, if, like in PTL 1, using both the amount of the part of the fuel which reaches the catalyst in the form of a liquid and the amount of the part of the fuel which reaches the catalyst in the form of a gas as the basis to estimate the degree of clogging, it is not necessarily possible to estimate the degree of clogging accurately.

Solution to Problem

According to the present invention, there is provided an exhaust purification system for an internal combustion engine, comprising: an exhaust purifier which forms a honeycomb structure and is arranged inside an engine exhaust passage; a secondary hydrocarbon feeder configured to feed hydrocarbons secondarily to an inside of an engine cylinder or an inside of an exhaust passage upstream of the exhaust purifier; and a clogging degree estimator configured to: estimate an amount of hydrocarbons which come from the secondary hydrocarbon feeder and then adhere in the form of a liquid to an inflow end of the exhaust purifier; estimate an amount of particulate matter which reaches the inflow end of the exhaust purifier; and estimate a degree of clogging at the inflow end of the exhaust purifier based on the estimated amount of hydrocarbons and the estimated amount of particulate matter.

Advantageous Effects of Invention

It is possible to accurately estimate the degree of clogging at the inflow end of the exhaust purifier.

DESCRIPTION OF EMBODIMENTS

Figure 1:
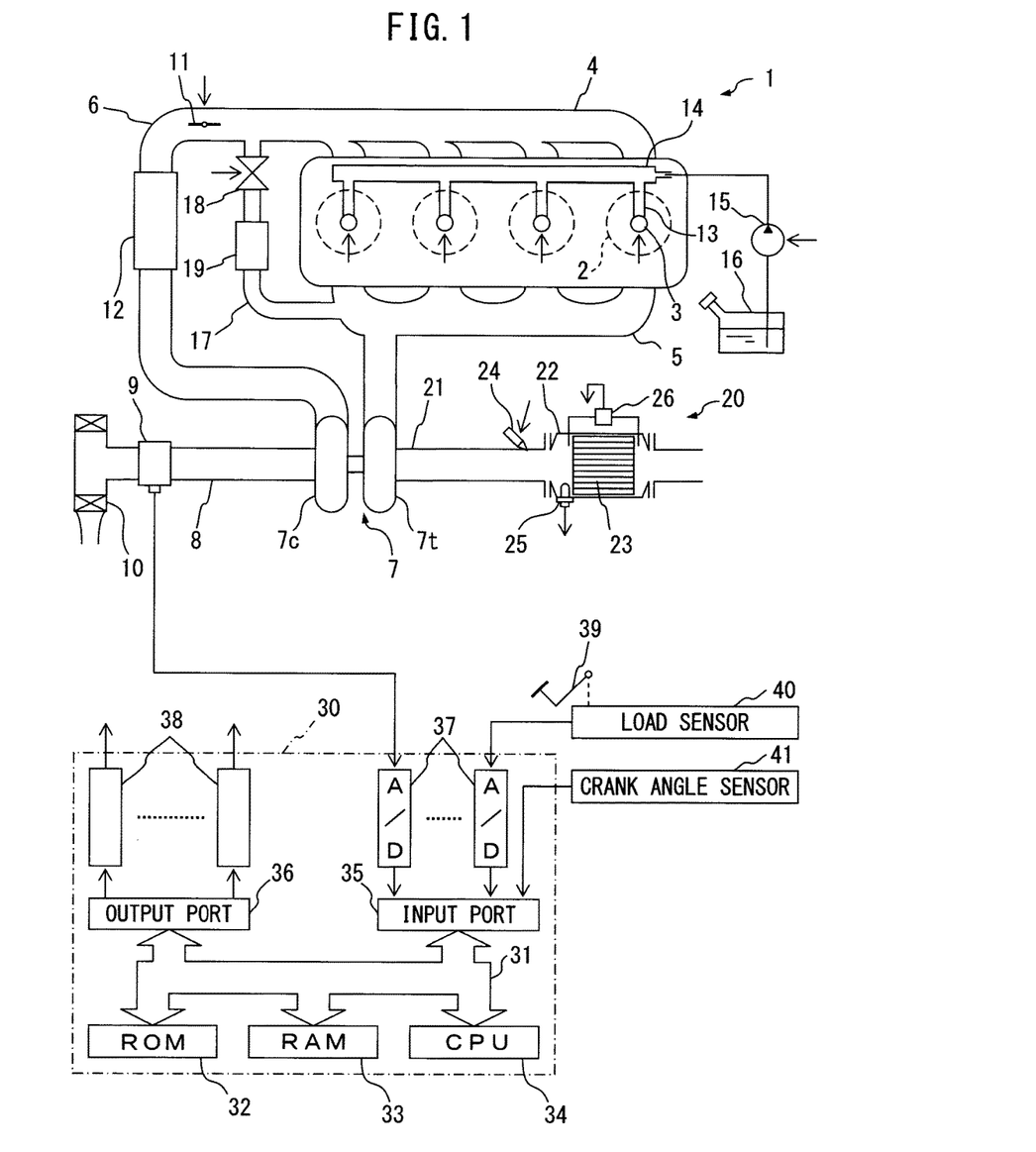
FIG. 1 is an overall view of an internal combustion engine.

Referring to FIG. 1, 1 indicates a body of a compression ignition type internal combustion engine, 2 a combustion chamber of each cylinder, 3 an electromagnetically controlled fuel injector for injecting fuel into each combustion chamber 2, 4 an intake manifold, and 5 an exhaust manifold. The intake manifold 4 is connected through an intake duct 6 to an outlet of a compressor 7c of an exhaust turbocharger 7, while an inlet of the compressor 7c is successively connected through an intake air introduction pipe 8 to an air flow meter 9 and an air cleaner 10. Inside the intake duct 6, an electrical control type throttle valve 11 is arranged. Furthermore, around the intake duct 6, a cooling device 12 is arranged for cooling the intake air which flows through the inside of the intake duct 6. On the other hand, the exhaust manifold 5 is connected to an inlet of an exhaust turbine 7t of the exhaust turbocharger 7. An outlet of the exhaust turbine 7t is connected to an exhaust post-treatment device 20.

Each fuel injector 3 is connected through a fuel feed tube 13 to a common rail 14. This common rail 14 is connected through an electrical control type of variable discharge fuel pump 15 to a fuel tank 16. Inside the fuel tank 16, fuel is stored in the form of a liquid. The fuel inside the fuel tank 16 is fed by the fuel pump 15 to a common rail 14. The fuel which is fed to the inside of the common rail 14 is fed through each fuel feed tube 13 to a fuel injector 3. In the embodiment according to the present invention, this fuel is comprised of diesel oil. In another embodiment which is not shown, the internal combustion engine is comprised of a spark ignition type internal combustion engine which burns fuel with a lean air-fuel ratio. In this case, the fuel is comprised of gasoline.

The exhaust manifold 5 and the intake manifold 4 are connected with each other through an exhaust gas recirculation (below, referred to as "EGR") passage 17. Inside the EGR passage 17, an electrical control type EGR control valve 18 is arranged. Further, around the EGR passage 17, a cooling device 19 is arranged for cooling the EGR gas which flows through the inside of the EGR passage 17.

The exhaust post-treatment device 20 comprises an exhaust pipe 21 which is connected to the outlet of the exhaust turbine 7t. This exhaust pipe 21 is connected to a casing 22. In the casing 22, an exhaust purifier 23 which forms a honeycomb structure is arranged. In the embodiment according to the present invention, the exhaust purifier 23 is comprised of a particulate filter 23 for trapping particulate matter in the exhaust gas. Further, at the exhaust pipe 21 which is positioned upstream of the particulate filter 23, an electromagnetic type addition valve 24 is attached which secondarily feeds hydrocarbons or fuel in the form of a liquid. The addition valve 24 is connected through another fuel pump which is not shown to the fuel tank 16. The fuel inside the fuel tank 16 is fed by a separate fuel pump to the addition valve 24. Next, the addition valve 24 is used to feed it to the particulate filter 23.

An electronic control unit 30 is comprised of a digital computer provided with components which are connected with each other by a bidirectional bus 31 such as a ROM (read only memory) 32, a RAM (random access memory) 33, a CPU (microprocessor) 34, an input port 35, and an output port 36. Upstream of the particulate filter 23 inside of the casing 22, a temperature sensor 25 for detecting a temperature of the exhaust gas which flows into the particulate filter 23 is attached. The temperature of the exhaust gas expresses a temperature of an inflow end of the particulate filter 23. Further, at the casing 22, a differential pressure sensor 26 is attached which detects a differential pressure across the particulate filter 23. Output voltages of the air flow meter 9, temperature sensor 25, and differential pressure sensor 26 are input through respectively corresponding AD converters 37 to the input port 35. Further, to an accelerator pedal 39, a load sensor 40 is connected which generates an output voltage which is proportional to an amount of depression of the accelerator pedal 39. An output voltage of the load sensor 40 is input through a corresponding AD converter 37 to the input port 35. Further, a crank angle sensor 41 which generates an output pulse each time a crankshaft rotates for example 30 degrees is connected to the input port 35. In the CPU 34, output pulses from the crank angle sensor 41 are used as the basis to calculate an engine speed. On the other hand, the output port 36 is connected through corresponding drive circuits 38 to the fuel injectors 3, drive device of the throttle valve 11, fuel pump 15, EGR control valve 18, addition valve 24, and other fuel pump (not shown).

Figure 2A:
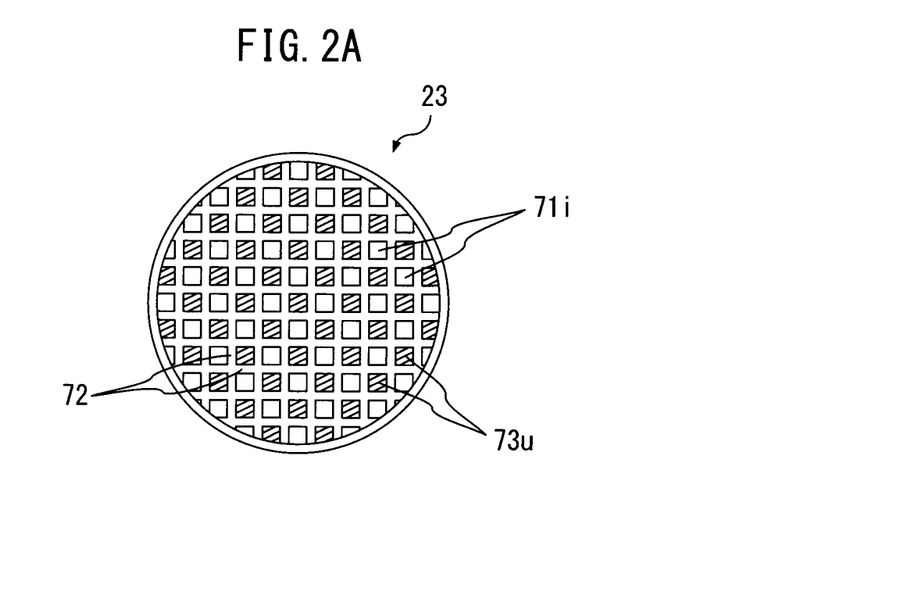
FIG. 2A is a front view of a particulate filter.
Figure 2B:
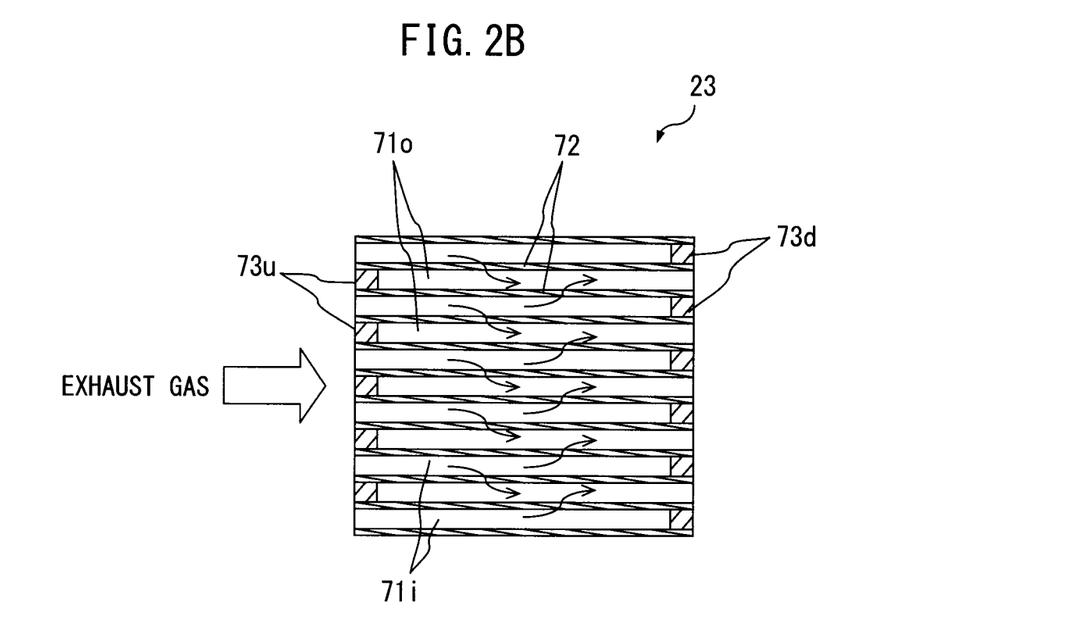
FIG. 2B is a side cross-sectional view of a particulate filter.

FIG. 2A and FIG. 2B show the structure of a wall flow-type particulate filter 23. Note that, FIG. 2A shows a front view of the particulate filter 23, while FIG. 2B shows a side cross-sectional view of the particulate filter 23. As shown in FIG. 2A and FIG. 2B, the particulate filter 23 forms a honeycomb structure which is provided with a plurality of exhaust flow passages 71i, 71o which extend in parallel with each other and partition walls 72 which separate these exhaust flow passages 71i, 71o from each other. In the embodiment which is shown in FIG. 2A, the exhaust flow passages 71i, 71o are comprised of exhaust gas inflow passages 71i which have upstream ends which are opened and have downstream ends which are closed by plugs 73d and exhaust gas outflow passages 71o which have upstream ends which are closed by plugs 73u and have downstream ends which are opened. Note that, in FIG. 2A, the hatched parts show plugs 73u. Therefore, the exhaust gas inflow passages 71i and exhaust gas outflow passages 71o are alternately arranged through thin partition walls 72. In other words, the exhaust gas inflow passages 71i and exhaust gas outflow passages 71o are arranged so that each of the exhaust gas inflow passages 71i is surrounded by four exhaust gas outflow passages 71o and each of the exhaust gas outflow passages 71o is surrounded by four exhaust gas inflow passages 71i.

The partition wall 72 is comprised of a porous material such as cordierite, silicon carbide, silicon nitride, zirconia, titania, alumina, silica, mullite, lithium aluminum silicate, zirconium phosphate, and other such ceramics. Therefore, as shown by the arrows in FIG. 2B, the exhaust gas first flows into the exhaust gas inflow passages 71i, then passes through the surrounding partition walls 72 and flows out to the adjoining exhaust gas outflow passages 71o.

In another embodiment which is not shown, the exhaust flow passages are comprised of exhaust gas inflow passages with upstream ends and downstream ends which are opened and exhaust gas outflow passages with upstream ends which are closed by plugs and with downstream ends which are open. In this example as well, part or all of the exhaust gas which flows into the exhaust gas inflow passages 71i passes through the insides of the partition walls 72 and flows out into the exhaust gas outflow passages 71o. In still another embodiment which is not shown, the exhaust purifier is comprised of a catalyst which has a honeycomb structure. The catalyst in this case is provided with a plurality of exhaust flow passages which are arranged in parallel with each other and partition walls which separate these exhaust flow passages from each other. The exhaust flow passages are comprised of exhaust gas passages with open upstream ends and open downstream ends.

Further, in the embodiment according to the present invention, the particulate filter 23 carries an $NO_x$ storage reduction catalyst. If referring to a ratio of amounts of air and fuel or hydrocarbons which are supplied into an engine intake passage, the combustion chambers 2 and the exhaust passage upstream of the particulate filter 23 as an air-fuel ratio of an exhaust gas and using the term "storage" as a term encompassing absorption and adsorption, this $NO_x$ storage reduction catalyst has the function of storing $NO_x$ when the air-fuel ratio of the exhaust gas is lean and releasing and reducing the stored $NO_x$ when a concentration of oxygen in the exhaust gas falls. This $NO_x$ storage reduction catalyst is provided with a precious metal catalyst which is comprised of platinum and a basicity layer which contains at least one element selected from potassium K, sodium Na, cesium Cs, or other such alkali metal, barium Ba, calcium Ca, or other such alkali earth metal, a lanthanoid or other such rare earth and silver Ag, copper Cu, iron Fe, iridium IR, or other such metal which can donate electrons to $NO_x$. Note that, the $NO_x$ storage reduction catalyst is provided with a precious metal catalyst, so also has an oxidation function.

Now, in the embodiment according to the present invention, fuel is burned in each combustion chamber 2 under an excess of oxygen. Therefore, as long as fuel is not secondarily fed from the fuel injector 3 and addition valve 24, the air-fuel ratio of the exhaust gas which flows into the $NO_x$ storage reduction catalyst is maintained lean. At this time, the $NO_x$ in the inflowing exhaust gas is stored in the $NO_x$ storage reduction catalyst. However, if the engine operating time becomes longer, an amount of $NO_x$ which is stored in the $NO_x$ storage reduction catalyst becomes greater and finally the $NO_x$ storage reduction catalyst ends up becoming unable to store $NO_x$.

Therefore, in the embodiment according to the present invention, the $NO_x$ storage amount of the $NO_x$ storage reduction catalyst is estimated and when the $NO_x$ storage amount exceeds a predetermined upper limit storage amount, $NO_x$ release processing which makes the air-fuel ratio of the inflowing exhaust gas rich or the stoichiometric air-fuel ratio is temporarily performed in order to release $NO_x$ from the $NO_x$ storage reduction catalyst and reduce the $NO_x$. As a result, the amount of $NO_x$ which is stored in the $NO_x$ storage reduction catalyst is decreased.

On the other hand, exhaust gas contains particulate matter which is mainly formed from solid carbon. This particulate matter is trapped on the particulate filter 23. In this case, as long as the fuel injector 3 and addition valve 24 do not secondarily feed fuel, the particulate filter 23 is in an oxidizing atmosphere. The particulate filter 23 carries an $NO_x$ storage reduction catalyst which has an oxidation function, as mentioned above. Therefore, the particulate matter which is trapped at the particulate filter 23 is successively oxidized. However, if an amount of trapped particulate matter becomes greater than an amount of particulate matter which is oxidized, the particulate matter gradually builds up on the particulate filter 23. If the amount of deposition of the particulate matter increases, a pressure loss of the particulate filter 23 increases and a reduction in the engine output ends up being invited.

Therefore, in the embodiment according to the present invention, when the amount of particulate matter which is deposited on the particulate filter 23 exceeds an upper limit trap amount, PM removal processing which raises and holds the temperature of the particulate filter 23 at a PM removal temperature or more under an oxidation atmosphere is temporarily performed in order to remove the particulate matter on the particulate filter 23 by oxidation. As a result, the particulate matter on the particulate filter 23 is oxidized and is thus removed and, therefore, the pressure loss of the particulate filter 23 is decreased. Note that, in the embodiment according to the present invention, when the differential pressure across the particulate filter 23 which is detected by the differential pressure sensor 26 exceeds a predetermined upper limit value, it is judged that the amount of particulate matter which has deposited on the particulate filter 23 exceeds an allowable upper limit amount. Further, the PM removal temperature is for example set to 600° C.

Figure 3:
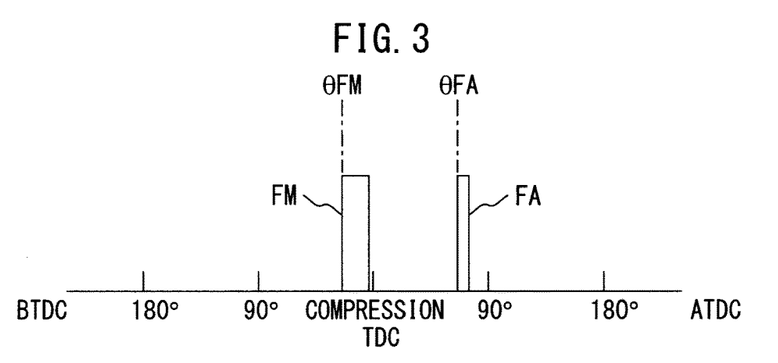
FIG. 3 is a graph which explains additional fuel FA.
Figure 4:
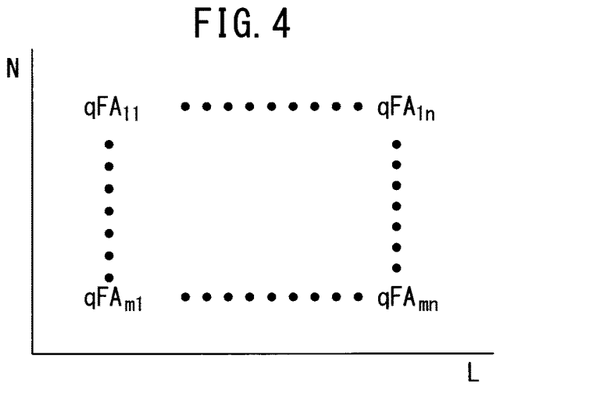
FIG. 4 is a view which shows a map of an amount of additional fuel qFA.
Figure 5:
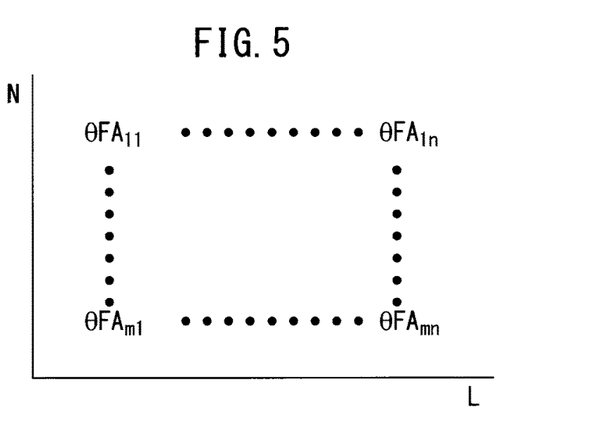
FIG. 5 is a view which shows a map of an injection timing OFA of additional fuel.

In this regard, in the embodiment according to the present invention, as shown in FIG. 3, around top dead center of the compression stroke (TDC), a fuel injector 3 injects main fuel FM into the combustion chamber 2. Note that the abscissa of FIG. 3 shows the crank angle. This main fuel FM is for obtaining the engine output. Furthermore, in addition to the main fuel FM, the fuel injector 3 can inject additional fuel FA into the combustion chamber 2 in the engine expansion stroke or exhaust stroke. This additional fuel FA is for example fed when the above-mentioned $NO_x$ release processing should be performed. That is, additional fuel FA is injected when the $NO_x$ storage amount exceeds the predetermined upper limit storage amount. Due to this, the air-fuel ratio of the exhaust gas which flows into the $NO_x$ storage reduction catalyst is temporarily switched to the rich side. As a result, the $NO_x$ storage reduction catalyst releases and reduces $NO_x$. An injection amount qFA per unit time and injection timing OFA of the additional fuel FA for $NO_x$ release processing are respectively stored as functions of an engine operating state, for example, the engine load L which is expressed by the amount of depression of the accelerator pedal 39, and the engine speed N, in the form of maps which are shown in FIG. 4 and FIG. 5, in advance in the ROM 32. In another embodiment which is not shown, additional fuel FA is injected for suppressing an amount of smoke in the exhaust gas.

Figure 6:
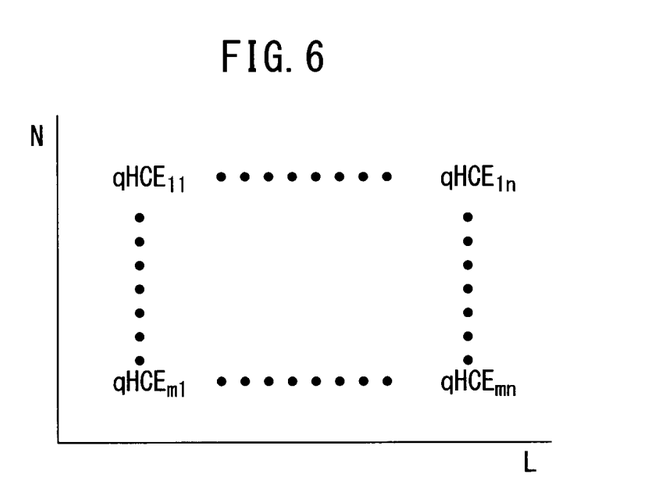
FIG. 6 is a view which shows a map of an amount of addition of hydrocarbons qHCE.

Further, in the embodiment according to the present invention, the addition valve 24 can secondarily feed fuel or hydrocarbons into the exhaust pipe 21. The hydrocarbons from the addition valve 24 are for example fed when the above-mentioned PM removal processing should be performed. That is, when the trapped amount of particulate matter of the particulate filter 23 exceeds the upper limit trapped amount, the addition valve 24 secondarily feeds hydrocarbons whereby the temperature of the particulate filter 23 is raised to and maintained at the PM removal temperature under an oxidizing atmosphere. As a result, the particulate matter which is trapped on the particulate filter 23 is removed by oxidation. An amount of addition of hydrocarbons qHCE per unit time for PM removal processing is stored as a function of the engine load L and engine speed N in the form of the map which is shown in FIG. 6 in advance inside the ROM 32.

Therefore, expressed conceptually, in the embodiment according to the present invention, a secondary hydrocarbon feeder is provided which is configured to feed hydrocarbons secondarily to an inside of the cylinder or an inside of the exhaust passage upstream of the exhaust purifier. In particular, the secondary hydrocarbon feeder is provided with one or both of an in-cylinder injector which is configured to secondarily inject hydrocarbons in the cylinder in the engine expansion stroke or exhaust stroke and an exhaust passage adder which is configured to secondarily add hydrocarbons to the inside of the exhaust passage upstream of the exhaust purifier. In the embodiment according to the present invention, the in-cylinder injector is provided with a fuel injector 3, while the exhaust passage adder is provided with an addition valve 24.

Figure 7:
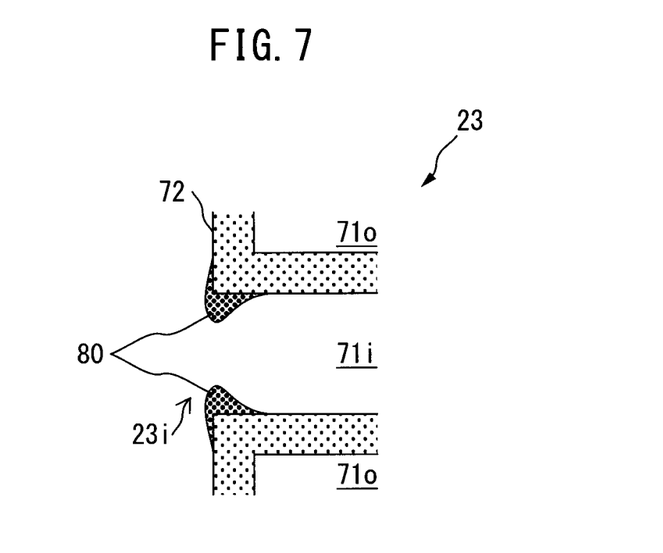
FIG. 7 is a partial enlarged cross-sectional view of an inflow end of a particulate filter.

In this regard, part of the particulate matter which is contained in the exhaust gas adheres to the upstream end or inflow end of the particulate filter 23, that is, to an inlet of the exhaust gas inflow passage 71$i$ and its surrounding partition wall 72. As a result, as shown in FIG. 7, a so-called deposit 80 is formed at the inflow end 23$i$ of the particulate filter 23. This deposit 80 does not separate from the particulate filter 23 even if receiving the flow of exhaust gas, and remains at the inflow end 23$i$. As a result, the opening area of the exhaust gas inflow passage 71$i$ becomes smaller. That is, clogging occurs at the inflow end of the particulate filter 23. Along with the elapse of time, the size of the deposit 80 grows larger. As the size of the deposit 80 grows larger, a degree of clogging at the inflow end 23$i$ becomes larger.

Therefore, in the embodiment according to the present invention, the degree of clogging at the inflow end 23$i$ of the particulate filter 23 is estimated or calculated. When the degree of clogging exceeds a predetermined upper limit degree, clogging removal processing is performed to remove the clogging at the inflow end 23$i$ of the particulate filter 23. As a result, the pressure loss of the particulate filter 23 is maintained small. In another embodiment which is not shown, an alarm device is activated when the degree of clogging exceeds the upper limit degree, so the fact of the degree of clogging exceeding the upper limit degree is informed to a vehicle operator.

In the embodiment according to the present invention, the degree of clogging DCL at the inflow end 23$i$ of the particulate filter 23 is estimated using the following formula (1):

$$DCL=DCL+dDCL \quad (1)$$

Here, dDCL expresses an amount of change or increase of the degree of clogging DCL per unit time. That is, the amount of change dDCL is repeatedly estimated and this amount of change dDCL is cumulatively added to estimate the degree of clogging DCL.

The amount of change of the degree of clogging dDCL per unit time is estimated based on an amount of particulate matter qPMi which reaches the inflow end 23$i$ of the particulate filter 23 per unit time and an amount of hydrocarbons qLHC which adhere to the inflow end 23$i$ of the particulate filter 23 in the form of a liquid per unit time. This is done for the following reason.

Figure 8A:
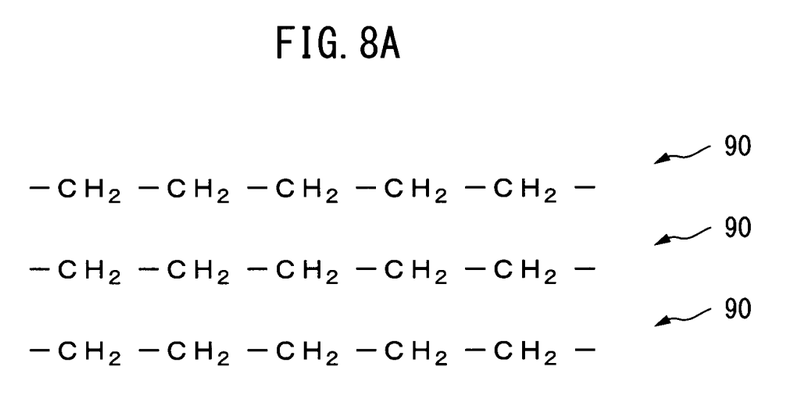
FIG. 8A is a schematic view which shows one form of hydrocarbons.
Figure 8B:
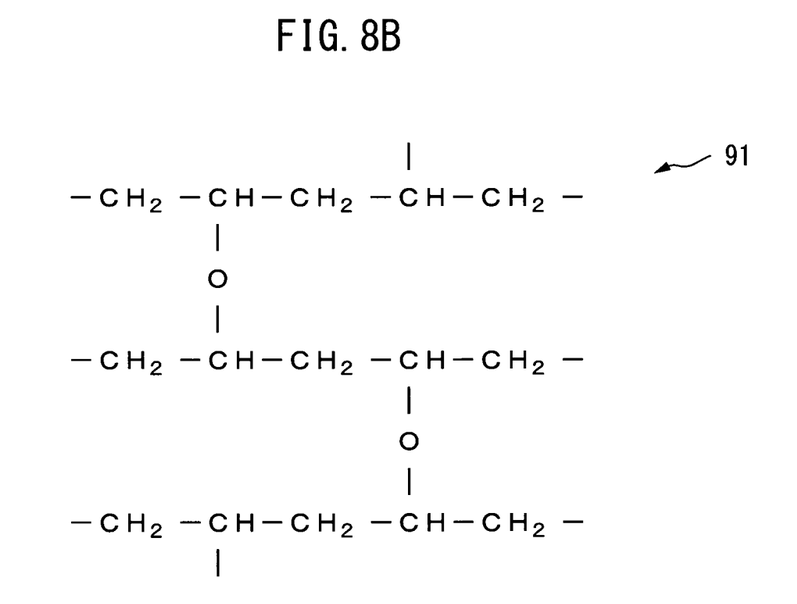
FIG. 8B is a schematic view which shows another form of hydrocarbons.

The present inventors engaged in intensive research on the deposit 80 at the inflow end 23$i$ of the particulate filter 23 and as a result discovered the following: That is, when additional fuel FA is not injected from the fuel injector 3 and hydrocarbons are not added from the addition valve 24, the exhaust gas which flows into the particulate filter 23 does not contain much hydrocarbons in the form of a liquid. As opposed to this, when additional fuel FA is injected from the fuel injector 3 or when hydrocarbons are added from the addition valve 24, the exhaust gas which flows into the particulate filter 23 contains hydrocarbons in the form of a liquid. The hydrocarbons in the form of a liquid next adhere together with the particulate matter to the inflow end 23$i$ of the particulate filter 23. Between the particles of the particulate matter which adhere to the inflow end 23$i$ or between the particulate matter and the surface of the partition wall 72, fine clearances, that is, capillaries, are formed. The hydrocarbons in the form of a liquid flow into the capillaries and are then held by capillary condensation in the form of a liquid. At this time, the hydrocarbons take the form of linear monomers 90 such as shown in FIG. 8A. Next, for example, if the engine operates under acceleration and thereby the temperature of the inflow end 23$i$ becomes higher than a polymerization start temperature of the hydrocarbons, for example, 150° C., under an oxidizing atmosphere, the hydrocarbons in the form of monomers polymerize by oxidation and thereby the polymer 91 such as shown in FIG. 8B is formed. This polymer 91 has the property of a binder. As a result, the particles of the particulate matter and the particulate matter and partition wall 72 are connected with each other. Therefore, the deposit 80 is fastened to the inflow end 23$i$. Note that, the diesel oil which is used as fuel contains various hydrocarbon components, so the above-mentioned polymerization start temperature is determined in accordance with the components of the monomer 90.

In this way, for formation or growth of the deposit 80, both the particulate matter and hydrocarbons in the form of a liquid play a major role. That is, if particulate matter does not adhere to the inflow end 23$i$, no deposit 80 is formed even if hydrocarbons in the form of a liquid adhere to the inflow end 23$i$. If hydrocarbons in the form of a liquid do not adhere to the inflow end 23$i$, no deposit 80 is formed even if particulate matter adheres to the inflow end 23$i$.

Therefore, in the embodiment according to the present invention, the amount of change dDCL per unit time of the degree of clogging is estimated based on the amount of particulate matter qPMi per unit time which reaches the inflow end 23$i$ of the particulate filter 23 and the amount of hydrocarbons qLHC per unit time which adhere to the inflow end 23$i$ of the particulate filter 23 in the form of a liquid. As a result, the amount of change dDCL of the degree of clogging can be accurately estimated and, therefore, the degree of clogging DCL can be accurately estimated. Therefore, in the embodiment according to the present invention, the clogging removal processing can be performed at a suitable timing.

Figure 9:
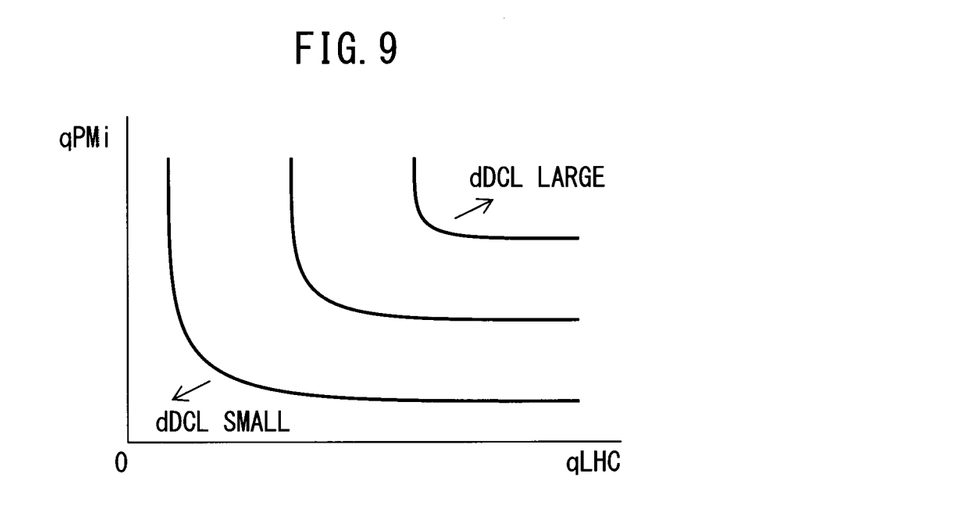
FIG. 9 is a view which shows a map of an amount of change of the degree of clogging dDCL.

One example of the amount of change dDCL per unit time of the degree of clogging is shown in FIG. 9. As shown in FIG. 9, when the amount of particulate matter qPMi is small, the amount of change dDCL of the degree of clogging is maintained small even if the amount of hydrocarbons in the form of a liquid qLHC increases. Further, when the amount of hydrocarbons in the form of a liquid qLHC is small, the amount of change dDCL of the degree of clogging is maintained small even if the amount of particulate matter qPMi increases. On the other hand, if both the amount of particulate matter qPMi and the amount of hydrocarbons in the form of a liquid qLHC increase, the amount of change dDCL of the degree of clogging becomes greater. The amount of change dDCL of the degree of clogging is stored in the form of the map which is shown in FIG. 9 in advance in the ROM 32.

Note that the hydrocarbons in the form of a liquid which reach the inflow end 23$i$ include a fraction of the hydrocarbons which have a higher boiling point than the temperature of the inflow end 23$i$ at this time and another fraction of the hydrocarbons which have a lower boiling point than the temperature of the inflow end 23$i$ at this time. The former adheres to the inflow end 23$i$ in the form of a liquid and the latter vaporizes and passes through the inflow end 23$i$. On the other hand, the hydrocarbons in the form of a gas which reach the inflow end 23$i$ include a fraction of the hydrocarbons which have a higher boiling point than the temperature of the inflow end 23$i$ at this time and another fraction of the hydrocarbons which have a lower boiling point than the temperature of the inflow end 23$i$ at this time. The former liquefies and adheres to the inflow end 23$i$ in the form of a liquid and the latter passes through the inflow end 23$i$ while it remains in a gas. Therefore, the hydrocarbons which adhere to the inflow end 23$i$ of the particulate filter 23 in the form of a liquid include hydrocarbons which reach the inflow end 23$i$ in the form of a liquid and hydrocarbons which reach the inflow end 23$i$ in the form of a gas then liquefy. The hydrocarbons which adhere to the inflow end 23i in the form of a liquid are held by the abovementioned capillary condensation in the form of a liquid.

Figure 10:
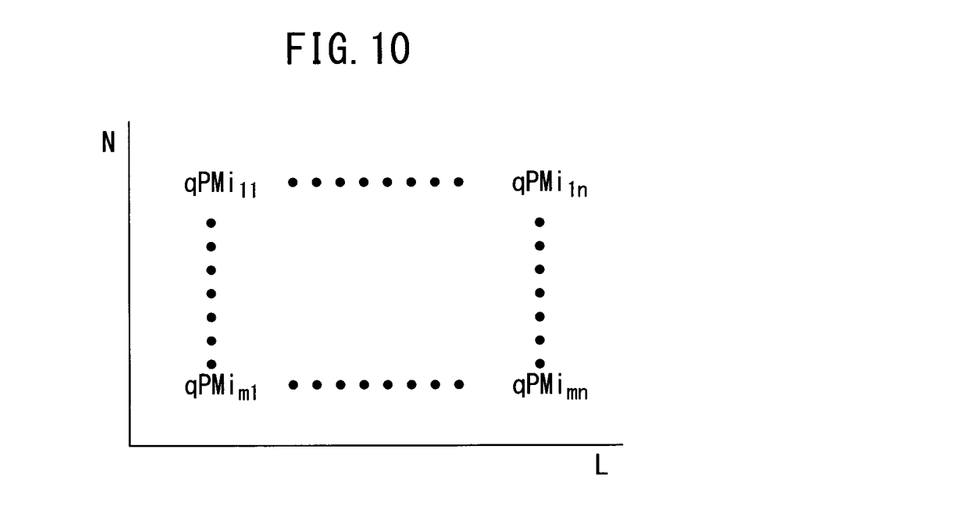
FIG. 10 is a view which shows a map of an amount of particulate matter qPMi.

The amount of particulate matter qPMi which reaches the inflow end 23i of the particulate filter 23 per unit time can be considered an amount of particulate matter which is exhausted from the combustion chamber 2. In the embodiment according to the present invention, the amount of particulate matter qPMi is stored as a function of the engine load L and engine speed N in the form of the map which is shown in FIG. 10 in advance in the ROM 32.

On the other hand, the amount of hydrocarbons qLHC which adhere to the inflow end 23i of the particulate filter 23 per unit time in the form of a liquid is estimated by the following formula (2).

$$qLHC = qLHCC + qLHCE \quad (2)$$

Here, qLHCC shows an amount of hydrocarbons which are secondarily fed into the combustion chamber 2 as additional fuel FA from the fuel injector 3 and then adhere to the inflow end 23i in the form of a liquid per unit time, while qLHCE shows an amount of hydrocarbons which are secondarily added to the inside of the exhaust pipe 21 from the addition valve 24 and then adhere to the inflow end 23i in the form of a liquid per unit time.

The amount of hydrocarbons qLHCC which come from the fuel injector 3 secondarily and then adhere to the inflow end 23i in the form of a liquid is estimated by the following formula (3).

$$qLHCC = qFA \cdot KC \quad (3)$$

Here, qFA, as explained above, expresses the amount of hydrocarbons per unit time which is secondarily fed as additional fuel FA from the fuel injector 3 into the combustion chamber 2 and, in the embodiment according to the present invention, is estimated using the map of FIG. 4. Further, KC shows a liquid ratio, that is, a ratio of an amount of hydrocarbons which adhere to the inflow end 23i in the form of a liquid with respect to an amount of secondary hydrocarbons qFA from the fuel injector 3 ($0 \leq KC \leq 1$).

Figure 11:
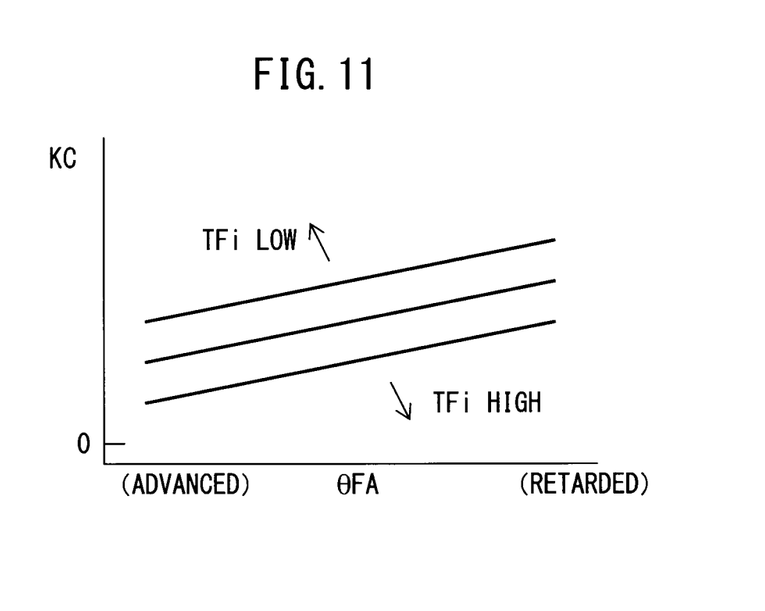
FIG. 11 is a view which shows a map of a liquid ratio KC.

The liquid ratio KC, as shown in FIG. 11, becomes larger as the injection timing $\theta$FA of the additional fuel FA is more retarded and becomes larger as the temperature TFi of the flow end 23i becomes lower. The liquid ratio KC is stored as a function of the injection timing $\theta$FA of the additional fuel FA and the temperature TFi of the inflow end 23i in the form of the map which is shown in FIG. 11 in advance in the ROM 32.

On the other hand, the amount of hydrocarbons qLHCE which come from the addition valve 24 secondarily and then adhere in the form of a liquid to the inflow end 23i is estimated using the following formula (4).

$$qLHCE = qHCE \cdot KE \quad (4)$$

Here, qHCE, as explained above, expresses the amount of hydrocarbons per unit time which are secondarily fed from the addition valve 24 to the inside of the exhaust pipe 21 and, in the embodiment according to the present invention, is estimated using the map of FIG. 6. Further, KE expresses a liquid ratio, that is, a ratio of an amount of hydrocarbons which adhere in the form of a liquid to the inflow end 23i with respect to an amount of secondary hydrocarbons qHCE from the addition valve 24 ($0 \leq KE \leq 1$).

Figure 12:
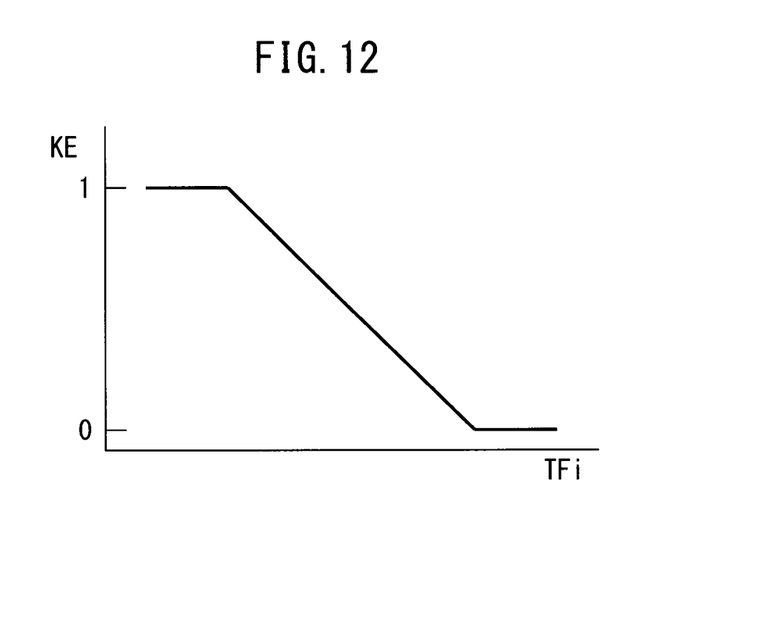
FIG. 12 is a view which shows a map of a liquid ratio KE.

The liquid ratio KE, as shown in FIG. 12, is held at 1 when the temperature TFi of the inflow end 23i is low, becomes smaller as the temperature TFi of the inflow end 23i rises, and is held at zero if the temperature TFi of the inflow end 23i becomes further higher. The liquid ratio KE is stored as a function of the temperature TFi of the inflow end 23i in the form of the map which is shown in FIG. 12 in advance in the ROM 32.

Therefore, if expressed conceptually, in the embodiment according to the present invention, a clogging degree estimator is provided which is configured to estimate a degree of clogging at an inflow end of the above-mentioned exhaust purifier. The clogging degree estimator is configured to estimate an amount of hydrocarbons which come from the above-mentioned secondary hydrocarbon feeder and then adhere in the form of a liquid to the inflow end of the exhaust purifier, and estimate an amount of particulate matter which reaches the inflow end of the exhaust purifier, and estimate the degree of clogging based on the estimated amount of hydrocarbons and the estimated amount of particulate matter. Further, the clogging degree estimator is configured to estimate the amount of hydrocarbons which come from the in-cylinder injector and then adhere in the form of a liquid to the inflow end of the exhaust purifier based on a hydrocarbon injection amount and hydrocarbon injection timing of the above-mentioned in-cylinder injector. Furthermore, the clogging degree estimator is configured to estimate the amount of hydrocarbons which come from the exhaust passage adder and then adhere in the form of a liquid to the inflow end of the exhaust purifier based on a hydrocarbon addition amount of the exhaust passage adder. Furthermore, the clogging degree estimator is configured to estimate the amount of hydrocarbons which come from the secondary hydrocarbon feeder and then adhere in the form of a liquid to an inflow end of the exhaust purifier based on an amount of the hydrocarbons from the secondary hydrocarbon feeder and a temperature of the inflow end of the exhaust purifier. Furthermore, the clogging degree estimator is configured to estimate an amount of hydrocarbons which adhere per unit time in the form of a liquid to the inflow end of the exhaust purifier, estimate an amount of particulate matter per unit time which reaches the inflow end of the exhaust purifier, estimate an amount of change per unit time of the degree of clogging based on the estimated amount of hydrocarbons per unit time and estimated amount of particulate matter per unit time, and cumulatively add the estimated amount of change to estimate the degree of clogging.

In this regard, when the polymer 91 such as shown in FIG. 8B is formed at the inflow end 23i, if the temperature of the inflow end 23i becomes higher that the heat decomposition temperature of the polymer 91, for example, 350° C., the polymer 91 breaks down by heat into carbon C, carbon dioxide $CO_2$, and water $H_2O$. As a result, the particles of the particulate matter and the particulate matter and partition wall 72 separate from each other and therefore the particulate matter is easily removed by the flow of exhaust gas from the inflow end 23i. That is, the deposit 80 is removed from the inflow end 23i. Note that the above heat decomposition temperature is determined in accordance with the composition of hydrocarbons which form the polymer 91.

Therefore, in the embodiment according to the present invention, as clogging removal control, temperature raising control is performed to raise and maintain the temperature of the inflow end 23i of the particulate filter 23 at a clogging removal temperature which is set at the heat decomposition temperature or more. As a result, the degree of clogging at the inflow end 23i is decreased.

Figure 13:
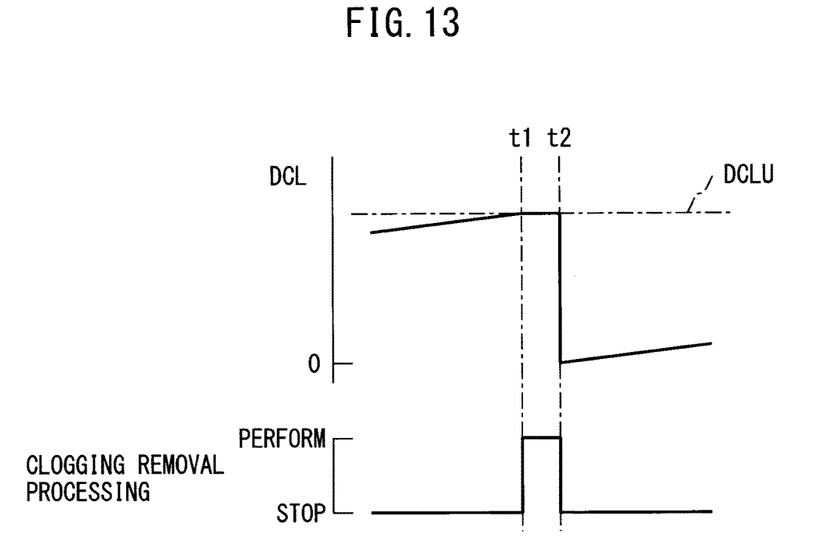
FIG. 13 is a time chart which explains clogging removal control.

That is, as shown in FIG. 13, at the time t1, if the degree of clogging DCL exceeds an upper limit degree DCLU, clogging removal control is started. As a result, the temperature TFi of the inflow end 23i of the particulate filter 23 is raised to and held at the clogging removal temperature. Next, at the time t2, if the clogging removal control is performed for a predetermined set time dt, the clogging removal control is stopped and the degree of clogging DCL is returned to zero. Note that, in the example which is shown in FIG. 13, when clogging removal control is being performed, the degree of clogging DCL is not updated, that is, is maintained.

In the embodiment according to the present invention, the clogging removal temperature is set to for example 350° C. or so. This clogging removal temperature is a temperature which is required for heat decomposition of the above-mentioned polymer 91, so is set to a temperature which is lower than the above-mentioned PM removal temperature. Note that, even when the above-mentioned PM removal processing has been performed, the temperature TFi of the inflow end 23$i$ is raised to the heat decomposition temperature or more and therefore the polymer 91 is broken down by the heat. Therefore, in the embodiment according to the present invention, the degree of clogging DCL is also returned to zero when PM removal processing has been performed.

Further, in the embodiment according to the present invention, clogging removal control or temperature raising control is performed by the fuel injector 3 injecting additional fuel in the engine expansion stroke or exhaust stroke and thereby the temperature of the exhaust gas which flows into the particulate filter 23 being raised. In another embodiment which is not shown, to perform clogging removal control or temperature raising control, the addition valve 24 adds hydrocarbons inside the exhaust pipe 21.

Figure 14:
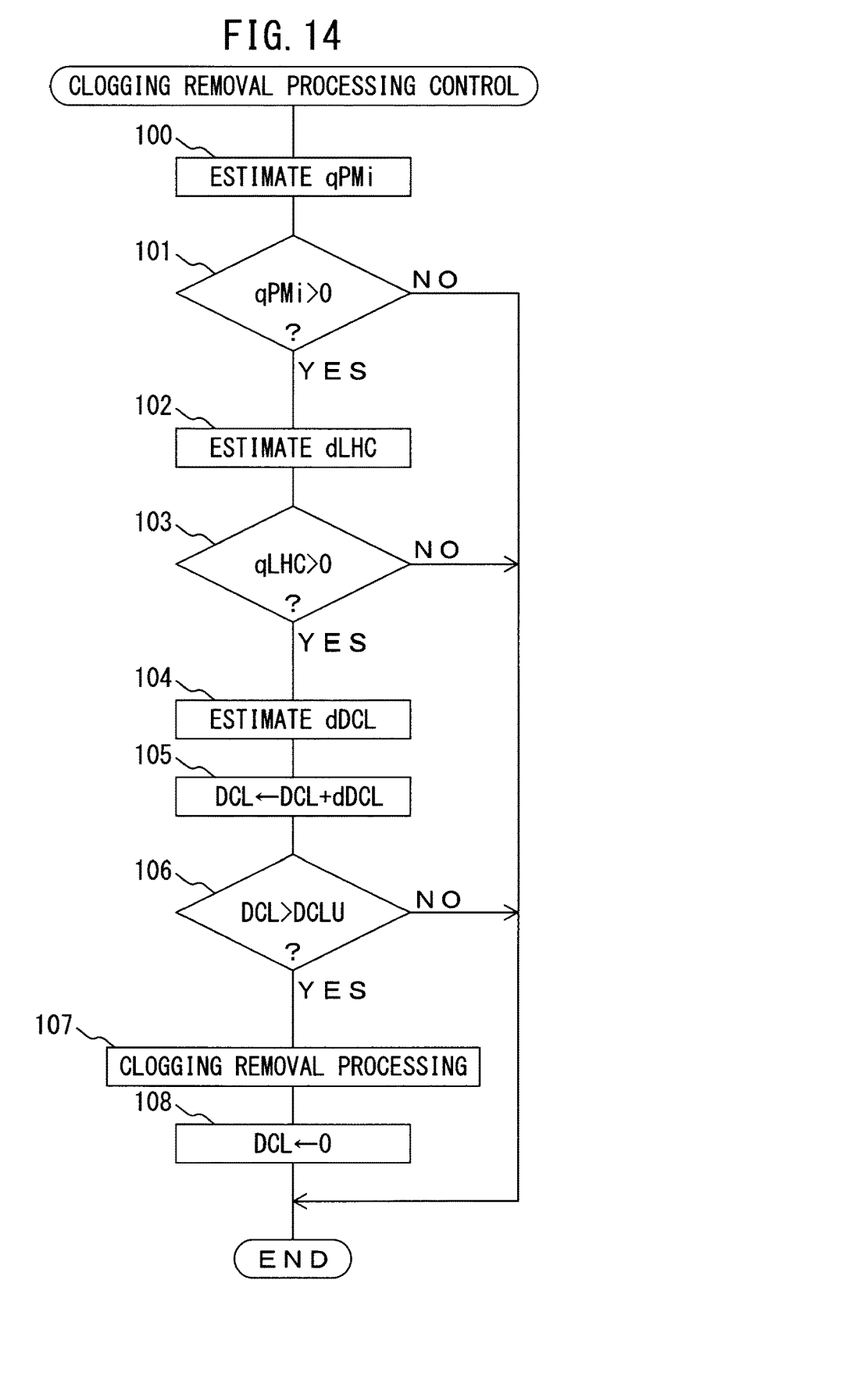
FIG. 14 is a flow chart which performs a control routine for clogging removal processing.

FIG. 14 shows a routine for execution of the above-mentioned clogging removal processing control. This routine is executed by interruption every predetermined set time. Referring to FIG. 14, at step 100, the amount of particulate matter qPMi per unit time which reaches the inflow end 23$i$ of the particulate filter 23 is estimated from the map of FIG. 10. At the next step 101, it is judged if the amount of particulate matter qPMi per unit time which reaches the inflow end 23$i$ of the particulate filter 23 is larger than zero. When qPMi≤0, that is, when the particulate matter has not reached the inflow end 23$i$ of the particulate filter 23, the processing cycle is ended. As opposed to this, when qPMi>0, that is, when the particulate matter reaches the inflow end 23$i$ of the particulate filter 23, next the routine proceeds to step 102 where the amount of hydrocarbons qLHC per unit time which adhere to the inflow end 23$i$ of the particulate filter 23 in the form of a liquid is estimated. Specifically, the amount of hydrocarbons qFA per unit time which is secondarily fed into the combustion chamber 2 as additional fuel FA from the fuel injector 3 is estimated from the map of FIG. 4. The liquid ratio KC is estimated from the map of FIG. 11. The amount of hydrocarbons qLHCC which come from the fuel injector 3 secondarily and then adhere to the inflow end 23$i$ in the form of a liquid is estimated using the above formula (3). Further, the amount of hydrocarbons qHCE per unit time which were secondarily fed from the addition valve 24 to the inside of the exhaust pipe 21 is estimated from the map of FIG. 6. The liquid ratio KE is estimated from the map of FIG. 12. The amount of hydrocarbons qLHCE which come from the addition valve 24 secondarily and then adhere to the inflow end 23$i$ in the form of a liquid is estimated using the above formula (4). The amount of hydrocarbons qLHC per unit time which adhere to the inflow end 23$i$ of the particulate filter 23 in the form of a liquid is estimated using the above formula (2). Next, at the next step 103, it is judged if the amount of hydrocarbons qLHC per unit time which adhere to the inflow end 23$i$ of the particulate filter 23 in the form of a liquid is greater than zero. When qLHC≤0, that is, when hydrocarbons do not adhere to the inflow end 23$i$ of the particulate filter 23 in the form of a liquid, the processing cycle ends. As opposed to this, at this time qLHC>0, that is, when hydrocarbons in the form of a liquid adhere to the inflow end 23$i$ of the particulate filter 23, next the routine proceeds to step 104 where the amount of change dDCL per unit time of the degree of clogging is estimated from the map of FIG. 9. At the next step 105, the degree of clogging DCL is estimated (DCL=DCL+dDCL). At the next step 106, it is judged if the degree of clogging DCL is larger than the upper limit degree DCLU. When DCL≤DCLU, the processing cycle is ended. As opposed to this, when DCL>DCLU, next the routine proceeds to step 107 where clogging removal processing is executed. At the next step 108, the degree of clogging DCL is reset to zero.

In the embodiments which were explained up to here, the estimation of the degree of clogging DCL was suspended during clogging removal processing, and the clogging removal processing was ended when the time for execution of the clogging removal processing became the set time. In another embodiment which is not shown, the estimation of the degree of clogging DCL is continued during the clogging removal processing and, when the estimated degree of clogging DCL becomes zero, the clogging removal processing is ended. In this case, an amount of decrease per unit time of the degree of clogging DCL is estimated based on for example the temperature TFi of the inflow end 23$i$.

REFERENCE SIGNS LIST 1. engine body
2. combustion chamber
3. fuel injector
21. exhaust pipe
23. particulate filter
23$i$. inflow end
24. addition valve
80. deposit

The invention claimed is:

1. An exhaust purification system for an internal combustion engine, comprising:
   an exhaust purifier which forms a honeycomb structure and is arranged inside an engine exhaust passage;
   a secondary hydrocarbon feeder configured to feed hydrocarbons secondarily to an inside of an engine cylinder or an inside of an exhaust passage upstream of the exhaust purifier; and
   a clogging degree estimator configured to:
     estimate an amount of hydrocarbons which come from the secondary hydrocarbon feeder and then adhere in the form of a liquid to an inflow end of the exhaust purifier per unit time;
     estimate an amount of particulate matter which reaches the inflow end of the exhaust purifier per unit time;
     estimate an amount of change of a degree of clogging at the inflow end of the exhaust purifier per unit time based on the estimated amount of hydrocarbons per unit time and the estimated amount of particulate matter per unit time; and
     cumulatively add the estimated amount of change to estimate the degree of clogging.

2. The exhaust purification system for an internal combustion engine according to claim 1, further comprising a controller configured to perform clogging removal processing for removing clogging at the inflow end of the exhaust purifier when the degree of clogging has reached a predetermined upper limit degree.

3. The exhaust purification system for an internal combustion engine according to claim 1, wherein the secondary hydrocarbon feeder comprises an in-cylinder injector configured to secondarily inject hydrocarbons in the cylinder in an engine expansion stroke or exhaust stroke, and the clogging degree estimator is configured to estimate the amount of hydrocarbons which come from the in-cylinder injector and then adhere in the form of a liquid to the inflow end of the exhaust purifier based on a hydrocarbon injection amount and hydrocarbon injection timing of the in-cylinder injector.

4. The exhaust purification system for an internal combustion engine according to claim 1, wherein the secondary hydrocarbon feeder comprises an exhaust passage adder configured to secondarily add hydrocarbons to the inside of the exhaust passage upstream of the exhaust purifier, and the clogging degree estimator is configured to estimate the amount of hydrocarbons which come from the exhaust passage adder and then adhere in the form of a liquid to the inflow end of the exhaust purifier based on a hydrocarbon addition amount of the exhaust passage adder.

5. The exhaust purification system for an internal combustion engine according to claim 1, wherein the clogging degree estimator is configured to estimate the amount of hydrocarbons which come from the secondary hydrocarbon feeder and then adhere in the form of a liquid to the inflow end of the exhaust purifier based on an amount of the hydrocarbons from the secondary hydrocarbon feeder and a temperature of the inflow end of the exhaust purifier.

6. The exhaust purification system for an internal combustion engine according to claim 1, wherein the exhaust purifier is comprised of a particulate filter configured to trap particulate matter which is contained in an exhaust gas.

* * * * *